United States Patent [19]
Lasoen et al.

[11] 4,161,238
[45] Jul. 17, 1979

[54] SELF ENERGIZING BRAKE ASSEMBLY

[75] Inventors: Jean J. Lasoen, Villepreux, France; Paul R. Chervenak, Warren, Mich.

[73] Assignee: Massey-Ferguson Inc., Detroit, Mich.

[21] Appl. No.: 805,052

[22] Filed: Jun. 9, 1977

[30] Foreign Application Priority Data

Aug. 6, 1976 [CA] Canada ............................ 258614

[51] Int. Cl.² ............................................ F16D 49/20
[52] U.S. Cl. .................................... 188/74; 188/72.2; 188/136
[58] Field of Search .................. 188/58, 72.2, 74, 135, 188/136, 342, 343

[56] References Cited

U.S. PATENT DOCUMENTS

| 1,920,078 | 7/1933 | Hargreaves | 188/136 |
| 3,406,793 | 10/1968 | Buyze | 188/72.2 |
| 3,780,835 | 12/1973 | Harrison | 188/72.2 |

FOREIGN PATENT DOCUMENTS

| 661547 | 7/1929 | France | 188/342 |
| 788841 | 1/1958 | United Kingdom | 188/72.2 |
| 1409238 | 10/1975 | United Kingdom | 188/74 |

Primary Examiner—Edward R. Kazenske
Attorney, Agent, or Firm—John C. Thompson

[57] ABSTRACT

A brake assembly for engaging the periphery of a rotatable member, the brake assembly being energized by rotation of the rotatable member in either direction. The brake assembly includes a movable brake shoe which may be forced into contact with the periphery of the rotating member. The brake shoe has spaced apart rollers which are held in engagement with converging ramps on a wedge block. The brake shoe is permitted to shift laterally with respect to the ramps, and as the brake shoe engages the rotating member one of the rollers will move downwardly along one of the ramps to affect self-energization of the brake shoe. The wedge block is provided with a downwardly extending projection which is disposed between the converging ramps, the projection being received within a recess formed in the brake shoe, the recess being of greater width than the projection. The recess and projection limits the lateral shifting of the brake shoe which takes place during self-energization and permits disengagement of the brake shoe even when a lateral shifting force is being imparted to the brake shoe by the rotatable member which would normally cause further self-energization.

2 Claims, 3 Drawing Figures

SELF ENERGIZING BRAKE ASSEMBLY

The present invention relates generally to braking structures, and more particularly to a self-energizing brake shoe which is adapted to contact the periphery of a rotatable member, the brake shoe being self-energizable due to rotation of the rotatable member in either direction.

The self actuating brake assembly of this invention has been designed for use as a parking brake for an agricultural tractor or the like. However, it should be obvious that this brake design may be used in other situations.

Agricultural tractors are generally provided with two braking systems, one being called the service brakes, and the other being called the parking brake. In a typical prior art agricultural tractor design the service brakes are employed to stop a moving vehicle, and when the moving vehicle is stopped the parking brake may be employed to keep the tractor from rolling. Thus, the service brakes may be disc brakes, and the parking brake may be a pawl which simply engages a gear tooth. Such prior art parking brakes are not particularly suitable for stopping a moving tractor, and it is desireable that the parking brake be designed so that it is capable of stopping a moving tractor and thus can be used as a backup system for the normal service brakes of a tractor. In addition, it is desireable that the parking brakes be so designed that they are capable of preventing movement of an agricultural tractor, which may weigh in the neighborhood of 6,000 kilograms exclusive of weights, implements, etc., from rolling in either a forward or reverse direction when parked on a 30° slope.

Therefore, it is the principal object of the present invention to provide a parking brake construction which can be utilized to stop a moving tractor and which will also hold the tractor from rolling in either direction when parked on a 30° slope.

More specifically, it is an object of the present invention to provide a self-energizing brake assembly contactable with a rotatable member which is self-energizing when placed into contact with the rotatable member for either direction of rotation whereby the force required to stop rotation of the rotatable member is reduced.

It is a further object of the present invention to provide a self-energizing brake assembly of the character described which can be readily released when in contact with a member which is tending to rotate in one direction or the other.

It is another object of the present invention to provide a brake assembly having a high degree of reliability.

These and other objects and advantages of the present invention will be apparent to those skilled in the art after a consideration of the following detailed description taken in conjunction with the accompanying drawings in which a preferred form of this invention is illustrated.

Figure 1:
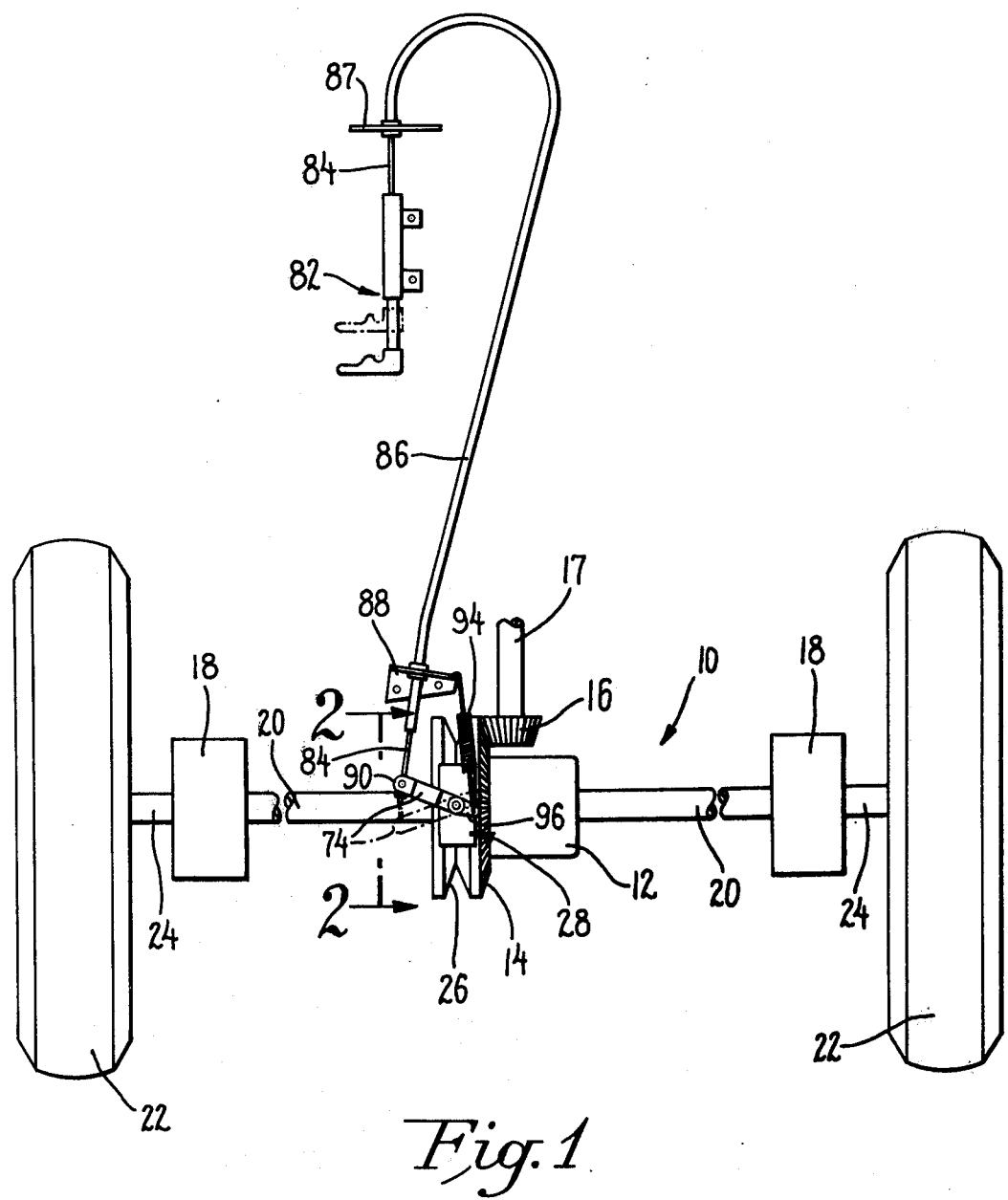
FIG. 1 is a schematic plan view of the pinion shaft, pinion, and rear axle assembly of a tractor to which the self-energizing brake assembly of this invention is applied, this view also showing the actuating means for applying the brake, the actuating means being shown in full lines in its applied position.

Referring first to FIG. 1, the rear axle assembly of a conventional agricultural tractor is indicated generally at 10. The rear axle includes a differential, a portion of which is indicated by the box 12, the differential also including a ring gear 14 which is adapted to be driven by a drive pinion 16 mounted on one end of a pinion shaft 17. (The pinion shaft is adapted to be driven in a conventional manner not material to the present invention.) The rear axle assembly further includes a final drive gear reduction device which is typically a planetary gear set mounted within a housing 18, the planetary gear reduction device being driven by opposed output shafts 20 of the differential. The tractor wheels and tires 22 are in turn driven by an output shaft 24 which extends outwardly of the housing for the planetary gear reduction device.

In accordance with the principles of the present invention the rotatable member or ring gear 14 is provided with a V-shaped groove 26 which is engageable by the self-energizing brake assembly of this invention, which is indicated generally at 28.

Figure 2:
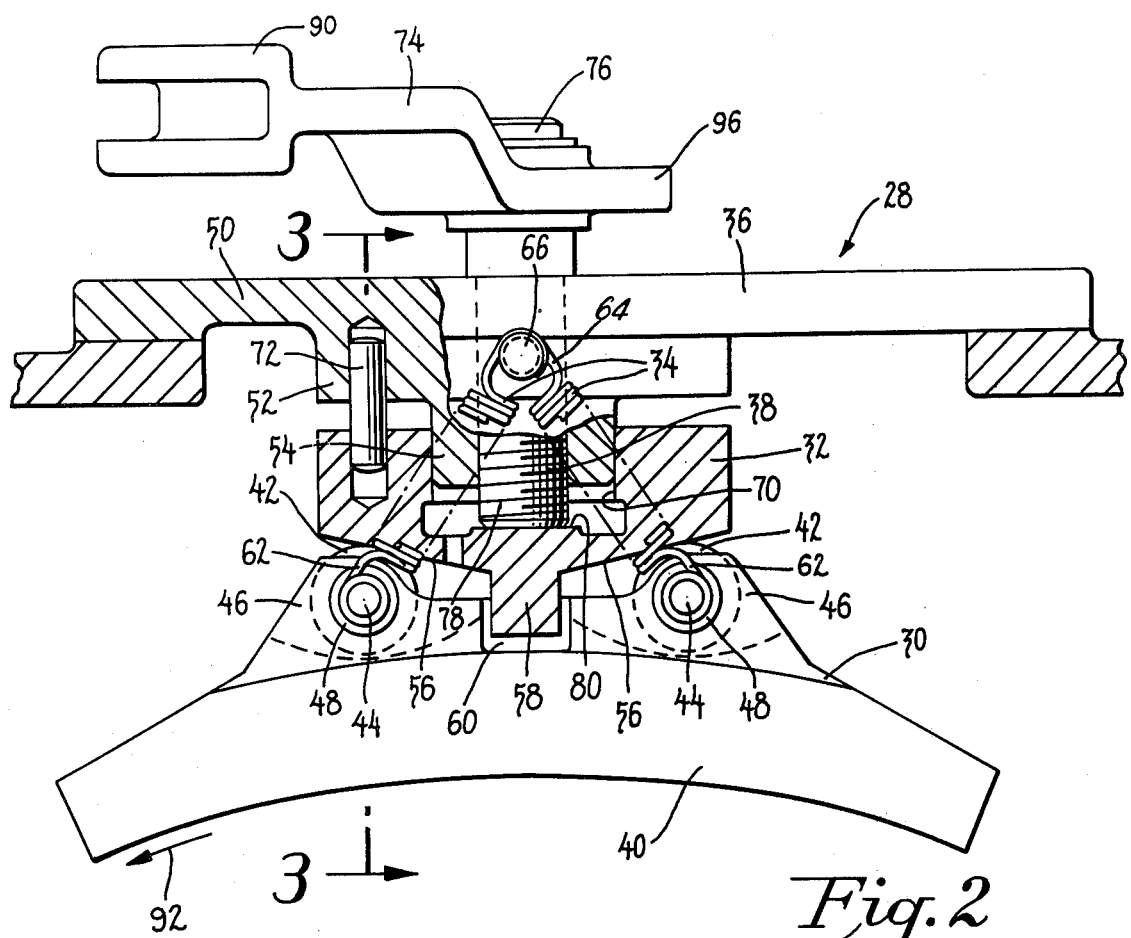
FIG. 2 is a view of only the self-energizing brake assembly taken along the line 2—2 in FIG. 1, portions of the brake assembly being shown in section for purposes of clarity.
Figure 3:
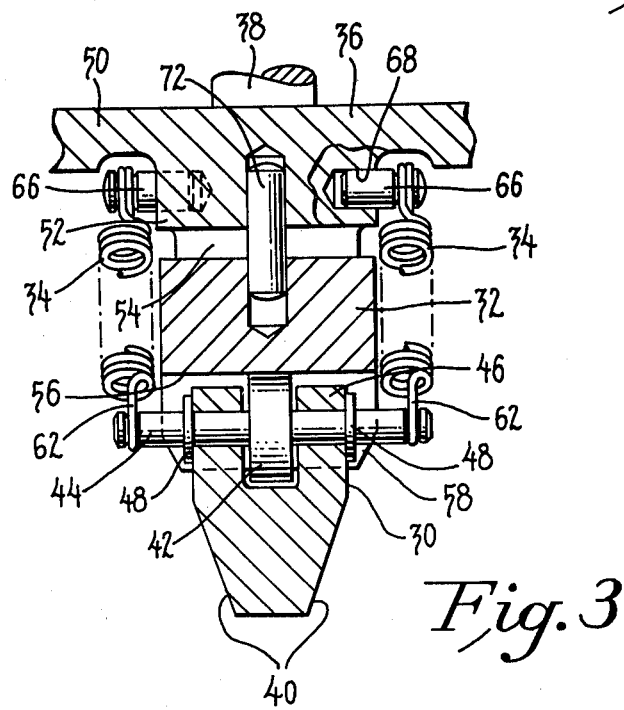
FIG. 3 is a section taken along the line 3—3 in FIG. 2.

Referring now to FIG. 2, the brake assembly includes a brake shoe 30, wedge block means 32, springs 34 which normally hold the brake shoe in contact with wedge block means, a cover assembly 36, and an operator controlled extensible and retractable force applying means which includes a screw 38 to positively advance the brake shoe towards and away from the ring gear 14. The brake shoe 30 is mounted for movement towards and away from the rotatable member 14 and is also mounted for lateral shifting movement along the periphery of the rotatable member. Thus, as viewed in FIG. 2, the brake shoe can shift from the normal position illustrated either to the left or to the right for the purposes which will be more fully bought out below. The shoe 30 has opposed sides, one side of which is provided with a V-shaped surface 40 which is adapted to frictionally contact the rotatable member 14, and more specifically, the V-shaped groove 26. The surface 40 may be coated with a friction material. The other side of the brake shoe is provided with spaced apart engaging means in the form of rollers 42 each of which is supported by pin means 44 supported by a pair of opposed ears 46. Each of the pins 44 extends to the outer side of the ears 46 and is held in place by retaining rings 48. Grooves (no number) are formed on the opposite ends of the pin 44 and each are adapted to receive one end of the springs 34.

The cover assembly or support member 36 is provided with a plate portion 50 which is adapted to be secured to a portion of the rear axle assembly. The support member also includes a first downwardly extending projection 52 and a second downwardly extending projection 54. The two projections are generally concentric with each other and both projections as well as the plate portion are provided with a common aperture which is adapted to receive the screw mechanism 38, the aperture being provided with threads at least in its lower end.

The wedge block means 32 has formed on its lower surface opposed inclined converging ramp surfaces 56, the adjacent ends of the opposed inclines converging ramp surfaces being disposed closer to the brake shoe than the other ends of the ramp surfaces. Disposed between the adjacent ends of the converging ramps is an outwardly extending projection 58 which is received within a recess 60 of greater width than the projection, the recess 60 being formed on said other or adjacent side of the brake shoe 30. The projection 58 and recess 60 act as motion limiting means which permits only limited lateral shifting of movement of the brake shoe relative to the wedge block means.

The spring 34 shown in FIG. 2 is one continuous spring, the end 62 of the spring being received in the grooves of pins 44, and the intermediate bight portion 64 being received within a groove (no number) of a pin 66 which is force fit into a suitable aperture 68 formed on the side of the first downwardly extending projection 52. The springs 34 thus serve to bias each of the rollers into contact with an associated ramp surface 56 and thus each of the ramp surfaces is normally maintained in contact with the adjacent roller. The wedge block 32 is also provided with an aperture 70 on the side opposite from the ramps 56, the second downwardly extending projection 54 being received in the aperture. For manufacturing convenience the aperture 70 has a cylindrical wall surface which generally corresponds to the cylindrical wall surface of the second projection 54. A pin 72 is provided which is received within corresponding aligned apertures in the cover assembly 36 and wedge block means 32 in order to prevent the wedge block 32 from rotating with respect to the cover assembly 36.

The force applying means includes, in addition to the screw 38, lever means 74 having an intermediate portion (as can best be seen in FIG. 1) which is rigidly fixed to one end 76 of the screw. The other end 78 of the screw passes through the second projection 54 and bears against a surface 80 of the wedge block means.

Manually operable means may be provided for applying the self-energizing brake assembly of this invention. Thus, a conventional brake handle assembly indicated generally at 82 may be mounted in the operator's station of the tractor, the brake handle assembly 82 being interconnected with a wire 84 of a bowden cable assembly 86. The sheath about the wire 84 is secured at its forward end to the tractor bulkhead 87 and at its rear end to a bracket 88 which is in turn secured to the tractor frame. When the handle is moved to its brake applying position shown in full lines in FIG. 1 the end 90 of the lever 74, which is engaged by the bowden wire 84, will be moved in a forward direction from its disengaged position shown in dotted lines in FIG. 1 to its brake applying position shown in full lines. The screw 38 will be caused to rotate by rotation of the lever 74, and as the lever is rotated to to its brake applying position the end 78 of the screw will move away from the plate portion 50 to force the brake shoe 30 towards the ring gear 14 until the V-shaped surface 40 of the brake shoe contacts the V-shaped groove 26 in the rotatable member 14. If the ring gear 14 is rotating in the direction indicated by the arrow 92 (FIG. 2) when the surface 40 contacts the surface 26 the frictional contact between the surfaces 40, 26 will tend to also move the brake shoe 30 in the direction indicated by the arrow 92. This will cause the right hand roller shown in FIG. 2 to move to the left further forcing the right hand surface 40 of the brake shoe into the groove 26. Thus, it can be seen that this brake shoe design is self-energizing in that as the brake shoe comes into contact with a rotating member a greater braking force will be applied. It should be obvious that if the rotatable member 14 were rotating in a direction opposed to the arrow 92 that the left hand roller 42 would shift to the right forcing the left hand side of the brake shoe further into the groove to further increase the braking effect.

To release the brake shoe it is only necessary to shift the brake handle assembly to the brake disengaged position, the disengaged position of the handle and lever 74 being shown in dotted lines in FIG. 1. When the handle is shifted to this position a spring 94, which extends between the bracket 88 and the other end 96 of the lever 74, will tend to swing the lever in a counterclockwise direction when viewed in FIG. 1. This will cause the screw 38 to rotate so as to move the other end 78 of the screw away from the rotatable member 14. When this happens the spring 34, acting through the rollers 42, will also move the wedge block and the brake shoe 30 in a direction away from the ring gear, thus releasing the gear. If however, the ring gear were imparting a force on the brake shoe 30 in the direction indicated by the arrow 92 when the spring was being backed away from the ring gear, the roller 42 would continue to shift to the left maintaining engagement. However, this shifting movement is limited by the projection 58 and recess 60 so that after only a small amount of further movement has taken place one of the side walls of the recess 60 will contact an adjacent side wall of the projection 58 to limit further self-energization so that additional movement of the screw 38 away from the ring gear will disengage the brake. Thus, the projection 58 and recess 60 act as limiting means to permit the brake shoe to be moved out of contact with the rotatable member when the rotatable member is imparting a lateral force on the brake shoe.

While a preferred structure in which the principles of the present invention have been incorporated is shown and described above, it is to be understood that the invention is not to be limited to the particular details, shown and described above, but that, in fact, widely differing means may be employed in the practice of the broader aspects of this invention.

What is claimed is:

1. A self-energizing brake assembly adapted to contact the surface of a rotatable member to hold it from rotation and in combination with a radially spaced away support member, said brake assembly comprising:

a laterally shiftable brake shoe disposed between the support member and the rotatable member and having opposed sides, one side being adapted to frictionally contact the surface of the rotatable member, and the other side being provided with a pair of rollers laterally spaced apart in the direction of rotation of the surface of the rotating member;

wedge block means mounted on the support for movement towards and away from said rotatable member, said wedge block means being provided with a pair of laterally spaced apart opposed inclined converging ramp surfaces;

spring means operable to maintain each of said opposed ramp surfaces in rolling contact with an associated one of said pair of rollers; and operator controlled extensible force applying means mounted on the support member and capable of positively advancing the wedge block means and the brake shoe towards the surface of the rotatable member to place said one side of the brake shoe into engagement with the surface of the rotatable member.

2. The self-energizing brake assembly set forth in claim 1 further characterized by the provision of motion limiting means to permit only limiting shifting of the brake shoe relative to the wedge block means, said motion limiting means including an outwardly extending projection on one of said wedge block means and brake shoe, and a recess of greater width than the projection on the other of said wedge block means and brake shoe, said projection being received within said recess.

* * * * *